S. A. SLAUSON.
GATE AND HINGE CONSTRUCTION.
APPLICATION FILED MAR. 12, 1919.

1,345,559. Patented July 6, 1920.

Inventor
Stephen A. Slauson,
By Walter N. Haskell.
his Attorney

UNITED STATES PATENT OFFICE.

STEPHEN A. SLAUSON, OF CEDAR RAPIDS, IOWA.

GATE AND HINGE CONSTRUCTION.

1,345,559.     Specification of Letters Patent.     Patented July 6, 1920.

Application filed March 12, 1919. Serial No. 282,226.

*To all whom it may concern:*

Be it known that I, STEPHEN A. SLAUSON, a citizen of the United States, residing at Cedar Rapids, in the county of Linn and State of Iowa, have invented certain new and useful Improvements in Gate and Hinge Construction, of which the following is a specification.

My invention has reference to gate and hinge construction, and relates more specially to means for supporting heavy farm gates and the like in such a manner that they may be held in adjusted positions on the post, at varying heights from the ground.

In those portions of the country which are liable to a considerable fall of snow in the winter season, a gate which is hung at the customary height from the ground frequently becomes inoperative on account of the depth of the snow being such as to inclose the lower part of the gate. Where the hinge members are rigidly attached to the gate and post the only remedy for the condition named is to clean the snow away from the gate and for a considerable distance on each side thereof. By the use of my device it is possible to support the gate in adjusted positions with relation to the post, at such heights as will permit the lower edge thereof to clear the surface of the snow in the movement of the gate in either direction. At other times the gate can be held in an elevated position, if desired, to permit the smaller farm animals to pass freely beneath the same.

Figure 1:
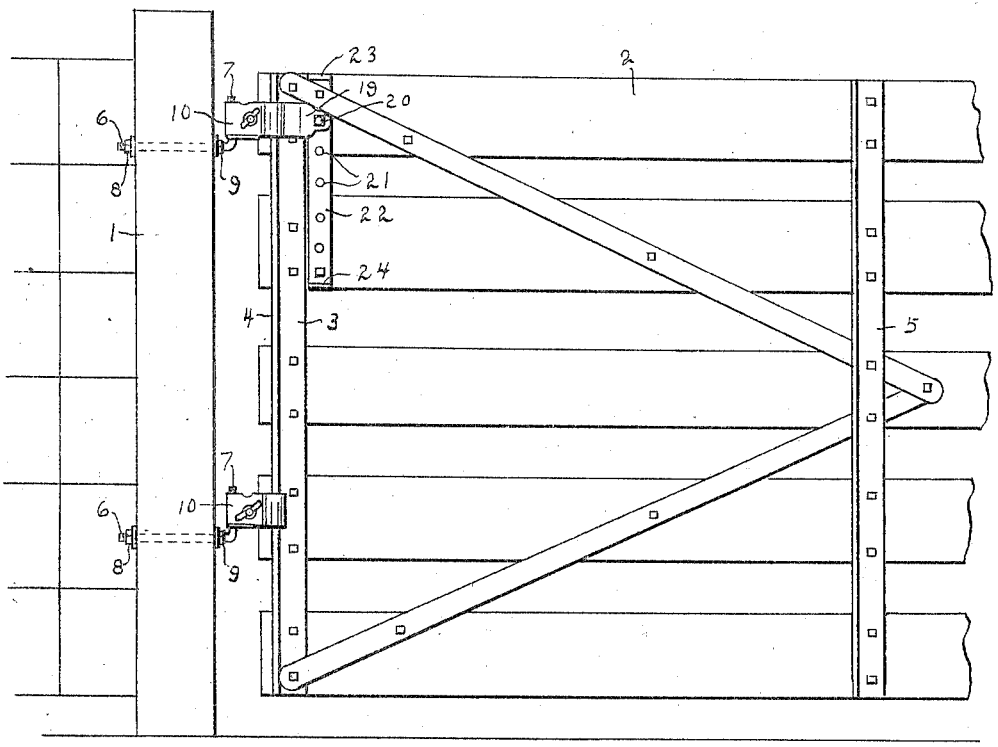
Figures 2, 3:
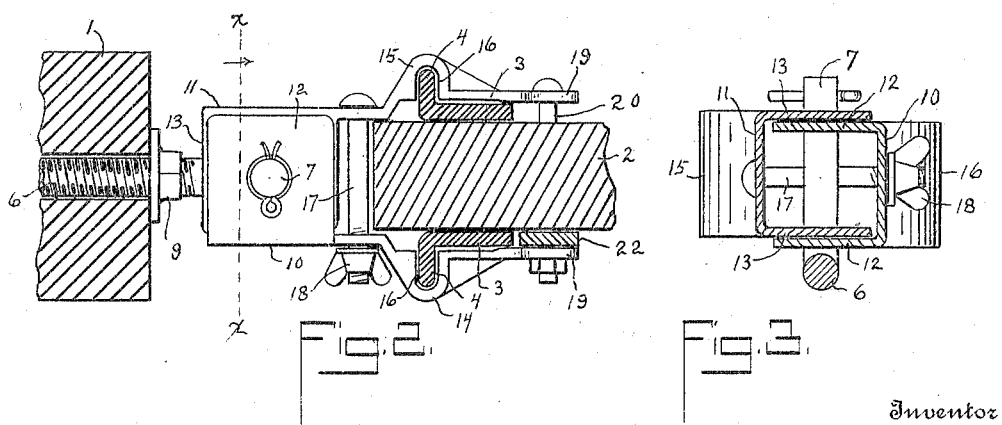

My invention is of a simple and cheap construction, and the form, arrangement and operation of the parts thereof will more fully appear from the following specification, reference being had to the drawings accompanying the same, in which:

Figure 1 is a side elevation of the hinged end of a gate and supporting post therefor. Fig. 2 is a plan view of my device, and related parts. Fig. 3 is a cross-section on the line *x—x* of Fig. 2.

1 represents a post, and 2 a gate, formed in the present case of a plurality of spaced-apart horizontal bars, united at their hinged end by a pair of braces 3, provided with outwardly turned flanges 4. Said bars may be further united at suitable intervals by other braces, as at 5. Passing through the post 1 are bolts 6, provided on their outer ends with vertical extensions 7. The bolts 6 are preferably threaded for the entire length of the post member thereof, and provided at one side of the post with a nut 8, and at the other side with a nut 9. By adjusting said nuts a vertical alinement of the extensions 7 can be secured when the bolts are first placed in position, and in the event of the post being moved out of a perpendicular line after the gate is in position a re-adjustment of such parts can be had, so as to maintain the vertical alinement of the extensions or pivots 7.

On each of the extensions 7 is pivotally mounted a pair of plates 10 and 11, by means of pairs of perforated ears 12 and 13 on said plates, the ears of one plate overlapping the ears of the other plate. Said plates are projected into a pair of clamp-jaws 14 and 15, provided with recesses 16 for engagement with the flanges 4, as is shown clearly in Fig. 2.

Passing through the plates 10 and 11 is a bolt 17, provided on its threaded end with a wing-nut 18, by means of which said plates can be drawn together, and the parts 14 and 15 caused to tightly engage the flanges 4, and hold the flanges from movement in said clamping members, and holding the gate at a desired height from the ground. By loosening the nut 18 said flanges are permitted a sliding movement within the clamp-members, so that the vertical position of the gate may be shifted, as desired. In the case of a heavy gate the friction between the clamp-members and flanges would ordinarily be sufficient to hold the gate in an elevated position, but after the height of the gate has been adjusted it is preferred to clamp the parts tightly together, against accidental slipping of the gate.

The lower hinge member is secured to the post at a point some distance above the lower edge of the gate when it is at its lowest point, so as to allow for the raising of the gate.

As an additional guard against accidental movement of the gate, the plates of the upper hinge are provided with extensions 19, perforated to permit the passage of a pin 20, which is held in one of a series of openings 21 in a bar 22, secured to the gate near the upper edge thereof. Upon raising or lowering the gate the perforations in the extensions are caused to register with one of the openings in said bar, and the pin or bolt inserted therein, preventing movement of the gate, vertically of the hinges. The ends of the bar 22 are provided, respectively, with outwardly turned lugs 23 and 24, which limit the movement of the gate upwardly or downwardly.

What I claim and desire to secure, is:

1. In a device of the class described, a suitable fixture; a pivot adapted to be rigidly supported by said fixture; a clamping device hingedly mounted on said pivot, and provided with a perforated extension; a gate provided at one of its ends with members having a vertical sliding relation with said clamping device; means for causing a clamping engagement between said last-named members and said clamping device; a bar secured to said gate and provided with a series of perforations; and a pin adapted to connect said bar with said extension.

2. In a device of the class described, a suitable fixture; a pivot adapted to be rigidly supported by said fixture; a pair of coacting clamp members hingedly mounted on said pivot; a gate provided at one of its ends with members having a sliding relation with said clamp-members, vertically; means for clamping said hinge members to said gate members; and an auxiliary supporting device attached to said gate, adapted for rigid engagement with said clamp-members, and provided with means for limiting the movement of the gate in an upward or downward direction.

In testimony whereof I affix my signature.

STEPHEN A. SLAUSON.